US011637749B1

(12) United States Patent
Patel et al.

(10) Patent No.: US 11,637,749 B1
(45) Date of Patent: Apr. 25, 2023

(54) METADATA SYNCHRONIZATION FOR REMOTE MANAGED SYSTEMS

(71) Applicant: Amazon Technologies, Inc., Seattle, WA (US)

(72) Inventors: Jaykumar Patel, Floral Park, NY (US); Akshay Ganesh Nadkarni, Westford, MA (US); Keerthi Bala, Lincoln, MA (US); Nishant Kanaiyalal Mehta, Southborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,825

(22) Filed: Mar. 31, 2022

(51) Int. Cl.
    *G06F 15/177* (2006.01)
    *H04L 41/082* (2022.01)
    *H04L 41/0869* (2022.01)
    *G06F 8/65* (2018.01)

(52) U.S. Cl.
    CPC ........ *H04L 41/082* (2013.01); *H04L 41/0869* (2013.01); *G06F 8/65* (2013.01)

(58) Field of Classification Search
    CPC ...... H04L 41/082; H04L 41/0869; G06F 8/65
    See application file for complete search history.

(56) References Cited

U.S. PATENT DOCUMENTS

| 9,323,546 | B2 * | 4/2016 | Rork | G06F 8/65 |
| 9,780,996 | B2 * | 10/2017 | Weens | H04L 41/0803 |
| 2010/0005143 | A1 * | 1/2010 | Weens | H04L 41/0803 709/204 |
| 2018/0287903 | A1 * | 10/2018 | Joshi | H04L 43/062 |
| 2018/0287926 | A1 * | 10/2018 | Williams | H04L 41/082 |
| 2020/0050494 | A1 * | 2/2020 | Bartfai-Walcott | G06F 9/5061 |
| 2020/0344135 | A1 * | 10/2020 | Guo | H04L 41/0869 |

FOREIGN PATENT DOCUMENTS

| CN | 106796514 A | * | 5/2017 | ......... G06F 3/04842 |
| CN | 112905210 A | * | 6/2021 | ............. G06F 8/65 |
| GB | 2392800 A | * | 3/2004 | ............. H04W 8/18 |

* cited by examiner

*Primary Examiner* — Richard G Keehn
(74) *Attorney, Agent, or Firm* — Robert C. Kowert; Kowert, Hood, Munyon, Rankin & Goetzel, P.C.

(57) ABSTRACT

Responsive to a configuration event, a controller instance generates, according to a current version of a configuration interface between the controller instance and a data instance, a configuration message. The configuration message is obtained, via message service, by remote data instances. The remote data instances attempt to process the configuration message, according to whichever version of the configuration interface the respective data instances are using. Appropriate acknowledgements (based on whether the remote data instances could fully process the configuration message or not) are generated and returned to the controller instance that marks a record for the configuration message as complete for the remote instance or marks the record for the configuration message to be re-sent for the remote instance. After waiting some period of time to allow data instances with out-of-date versions to update, a configuration message update cycle re-sends the message to the appropriate remote data instances.

20 Claims, 8 Drawing Sheets

US 11,637,749 B1

METADATA SYNCHRONIZATION FOR REMOTE MANAGED SYSTEMS

BACKGROUND

In some systems, services are distributed over a network (e.g., for high-availability or the like). Upgrades to some such services may be performed in a manner to avoid downtime (e.g., in a rolling fashion or the like) but some such upgrade techniques may result in various service instances being of different versions than other service instances. Techniques for addressing such disparities can become cumbersome, increase coupling between control and data layers (for systems having such architectures) and otherwise increase difficulty of maintaining and managing upgrades to some such services.

Figure 1:
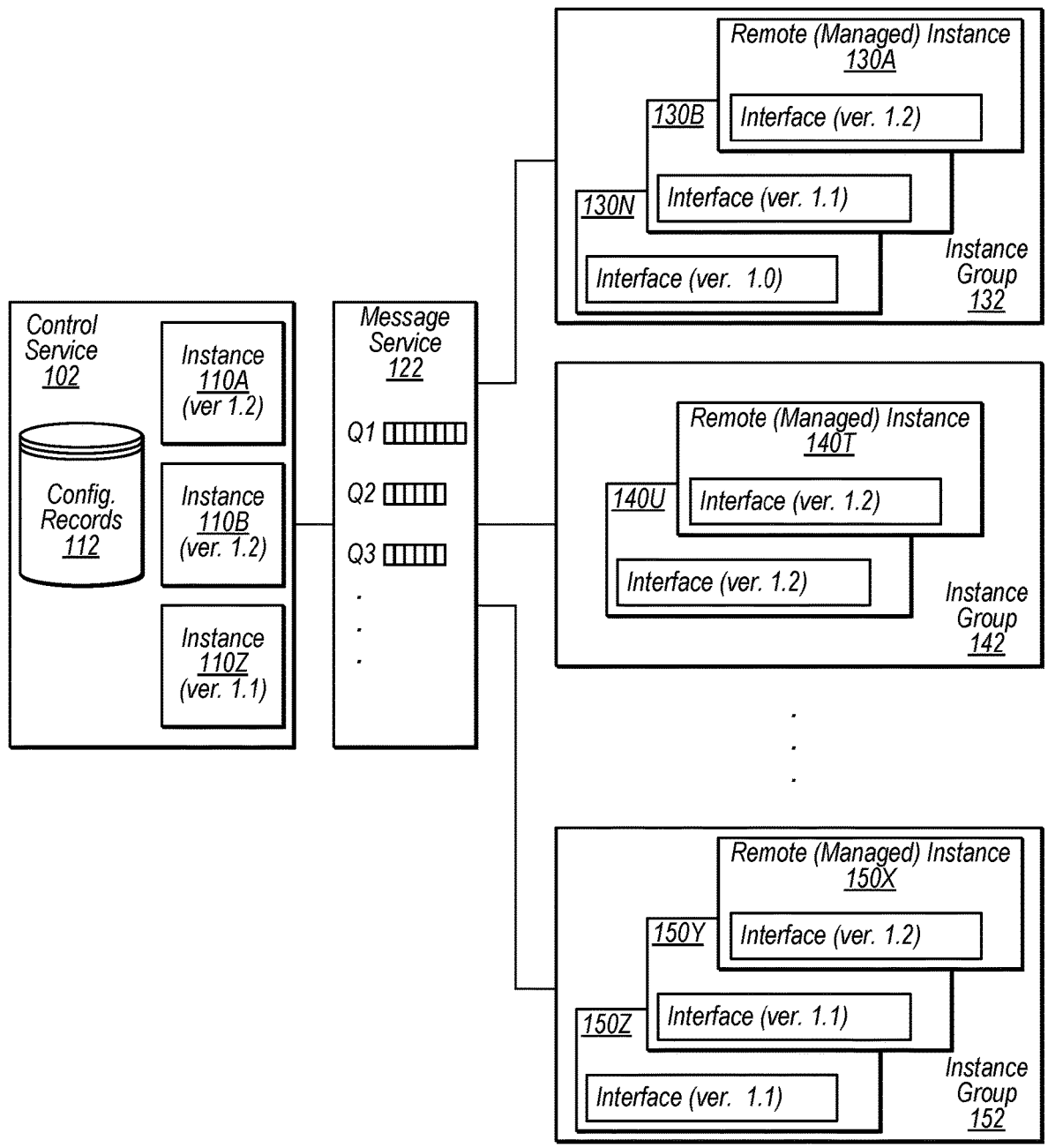
FIG. 1 illustrates an example system architecture in which metadata synchronization for remote managed systems is implemented, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, systems and methods for metadata synchronization for remote managed systems is implemented, according to some embodiments. Some embodiments describe techniques for sharing metadata of new or existing resources between distributed services without downtime.

Systems with evolving services may exhibit repeated need for new features which may require addition of more metadata to existing resources (e.g., such as, but not limited to, storage resources such as storage objects, and access points). In embodiments access points are named network endpoints that are attached to storage objects (e.g., buckets), that can be used to perform object operations, such as GetObject and PutObject. Network endpoints may be referred to by an alias for a network path definition used to access a storage object. Such features may be required to be backwards compatible and may have to be propagated to a data plane for already-created resources.

In one non-limiting example, a new access point alias feature automatically creates an alias each time a customer creates a new access point. For any pre-existing access points the alias is pre-generated at the time of feature release so customers do not have to take an additional action. When the customer makes object calls to the access point alias, a data plane should already be aware of the alias to properly serve the request, which requires that a control plane must have already sent such data to the data plane.

One solution to the above-noted technical challenge is for the data plane application to be updated to support a new version of the access point creation command and/or provide a new command to update a new field (such a technique may also be applicable to other changes to a metadata structure, other than a new field being added, in some embodiments). For this solution, the data plane update must be deployed before the control plane update and the control plane has to know when to send the update command vs. the second version of the access point creation command. Such a solution is cumbersome, increases coupling between the data plane and the control plane and makes it difficult to maintain and managed the system. Such a solution may also be non-extensible. If another new field needs to be added, a new command needs to be supported by both the control plane and the data plane and additional fields in the control planes data store are required to maintain propagation state.

Embodiments described herein may not need a new command for every new field, do not need version of commands, do not require a strict deployment order among services, work without downtime, work with various types of deployment (e.g., rolling deployments), handle metadata back-fill for existing resources, and may be extensible to facilitate adding new fields.

In one non-limiting example, a control plane service (e.g., a micro-service A or the like) may need to share a new field for an existing resource type with a data plane (e.g., another micro-service B or the like). For the data plane to support, when the data plane receives a create command with more fields than it is currently configured for, the data plane will ignore the fields that aren't yet configured but save the fields that are currently configured to a data store. When the data plane sends the acknowledgement back to the control plane, the data plane sends a versioned acknowledgement that indicates to the control plane that the create command needs to be retried (until all fields are recognized once the data plane is updated). Such a way of storing only known, or currently configured, fields supports backward compatibility. The control plane supports the change by storing the versioned acknowledgement in a data store for each resource that it wants to send to the data plane. In the application code, where it is sending a message to create a resource, the application may store a "target version" which will be increased with each new field or whenever the control plane needs to send more metadata. Whenever a code change that increments "target version" is deployed, control plane code will detect that resources in its data store, determine that the version acknowledged is less than its target version and send all the metadata to the data plane. If the data plane is configured with the latest code it will save all this metadata and acknowledge the right version.

While such a solution allows for services to be deployed in any order, deployment of the data plane first (so the creation of the resource is complete), will avoid or at least reduce message retries.

In embodiments herein, reference is made to versions of a configuration interface. In embodiments, one version (ver. 1.2) may be greater than another version (ver 1.0). One version (ver. 1.0) may be older than another version (ver. 2.0), in embodiments.

In another, related example, a system includes a configuration controller (e.g., a control plane feature) for managing configuration information for remote instances. The configuration controller generates, using a current version of a configuration interface at the controller, a configuration message for one or more of a number of remote service instances. The message includes fields according to the current configuration interface version, in embodiments.

The configuration controller sends the configuration message, according to the current configuration interface version, to a message service for the target remote service instance and records the configuration message and configuration interface version sent for the respective ones of the one or more target remote service instances to a data store. Responsive to acknowledgement of the configuration message from one of the target remote service instances the configuration controller marks a record for the configuration message as complete for the target remote service instance. The record is marked for an acknowledgement that is positive or that indicates that a version of the configuration interface that is up-to-date, with respect to the version used to generate the message, was used by the target remote service instance to process the configuration message. For an acknowledgement that is negative or indicates use of an out-of-date interface version (with respect to the version used to generate the message, by the target remote service instance) the configuration controller marks a record for the configuration message to be re-sent for the target remote service instance.

In embodiments, the up-to-date version of the configuration interface is a version that is the same or newer than the version used for said generation of the configuration message. The out-of-date version of the configuration interface is a version older than the up-to-date version, in some embodiments.

In another related embodiment, a managed instance obtains a configuration message from a message service. The configuration message is for configuring functionality of the managed instance, in embodiments. The managed instance may determine, according to a version of a configuration interface used by the managed instance to process or store the configuration message: whether fields of the configuration message are recognized, or whether the version of the configuration interface used by the managed instance is out-of-date relative to an interface version indicated for the message.

For the case where the fields of the configuration message are recognized or the version of the configuration interface is not out-of-date, the manage instance may: process or store the complete configuration message, and send an acknowledgement that is positive or indicates a configuration interface version used by the remote service instance that is up-to-date, with respect to the interface version indicated for the configuration message, to a control service. For the case where one or more of the fields are unrecognized or the version of the configuration interface is out-of-date, the managed instance may: process or store the recognized message fields, and send an acknowledgement that is negative or indicates an out-of-date configuration interface version, with respect to the interface version indicated for the configuration message, to the control service.

In some embodiments, the managed instance is a storage service managed instance that processes data storage requests. For example, the managed instance may, responsive to receipt of a data storage request from a client: perform, at a client data store hosted by the managed instance, one or more storage operations indicated by the data storage request, and return an acknowledgement of performance of the data storage request to the requesting client. In some embodiments, the managed instance is a remote instance of a data storage service hosted by a service provider and may receive the data storage request via a storage service data interface for the storage service hosted on the service provider network and that manages the managed instance.

In some embodiments described herein, a new version of an interface is used to send all fields (including old and new fields). When new fields are added on the data plane side, the control plane may be updated to send these new fields along with old data. The data plane stores what it is configured for and responds with an acknowledgement (e.g., all stored=false/true). If all_stored=false, the control plane keeps calling the API until the corresponding data plane instance is upgraded and responds with all_stored=true, which configures the control plane to determine that all new metadata is shared and the control plane can inform the customer that propagation is done. In some such embodiments, control plane servers and data plane servers can be upgraded independently while the metadata sharing is in progress. In embodiments, data plane servers that are using older versions of the interface will be able to work with a control plane server using a newer version of the interface that is sending the newer metadata or vice-versa making it backwards and upwards compatible.

Attention is now brought to the FIGS. 1-8. Generally, FIGS. 1, 6, 7 and 8 illustrate components of a system that perform various of the functionality illustrated in FIGS. 2-5. The figures begin by illustrating an example system and functionality that may be performed by a control layer of the system. For example, control instances in FIGS. 1, 6, 7 and 8 may perform functionality illustrated in FIGS. 2 and 3. The figures then depict functionality and system components directed to remote instances that are configured by the control layer components. For example, remote instances in FIGS. 1, 6, 7 and 8 may perform functionality illustrated in FIGS. 4 and 5. The figures are illustrative in nature; more, fewer or different components than those depicted may perform the illustrated functionality, in various embodiments.

Figure 2:
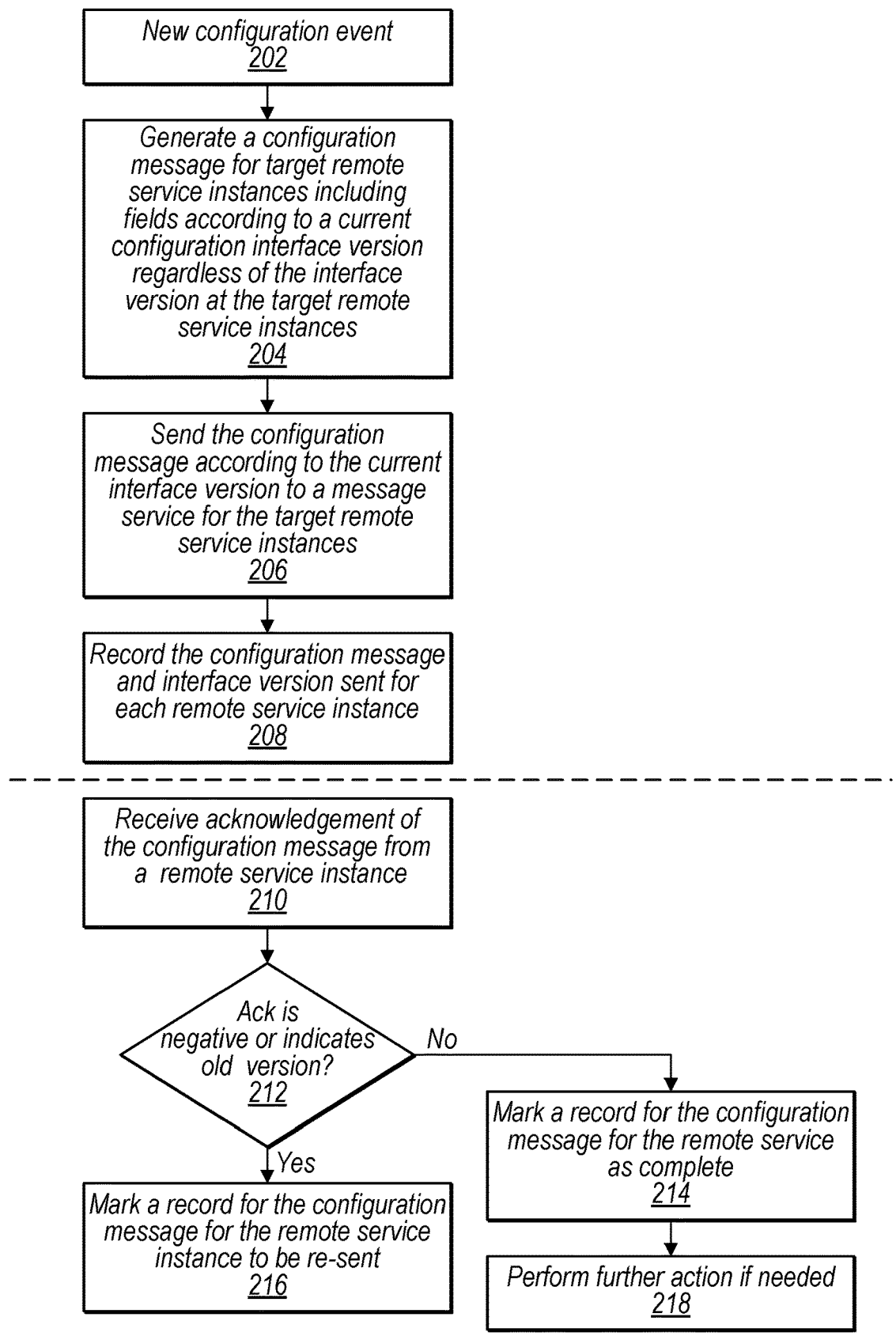
FIG. 2 illustrates a process diagram of metadata synchronization for remote managed systems, according to some embodiments.

FIG. 1 illustrates an example system architecture in which metadata synchronization for remote managed systems is implemented, according to some embodiments. In particular, FIG. 1 illustrates a control service 102 with configuration records 112 and control instances 110A, 110B, 110Z (e.g., a control layer, in some embodiments). The control instances may, based on a configuration event, generate a configuration message and send the configuration message to remote instances 130A, 130B, 130N, 140U, 140T, 150X, 150Y, 150Z via message service 122 (e.g., via message queues Q1, Q2, Q3) of message service 122) as illustrated in FIG. 2, for example. The control instance may generate fields of the message in accordance with a current interface version of the control instance 110 (regardless of the interface version currently used by a target one of the remote instances that process the configuration message). The remote instances may be grouped as instance groups 132, 142, 152. For example, each instance group may be located physically (and/or logically) at a distinct client network or each remote instance of a group may be located physically (and/or logically) at a different client network of a same client, without limitation.

Figure 4:
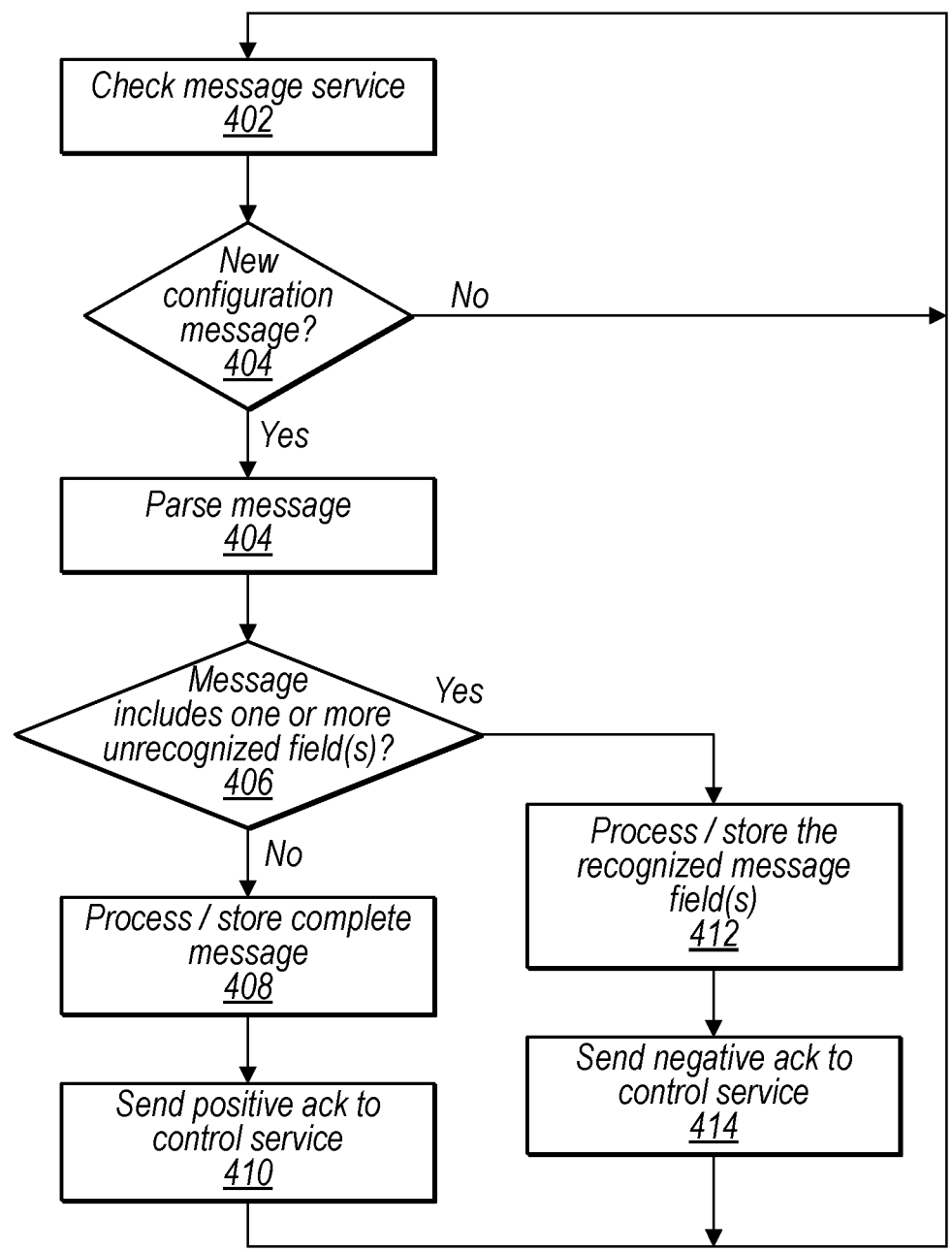
FIG. 4 illustrates a process diagram of metadata synchronization for remote managed systems, according to some embodiments.
Figure 5:
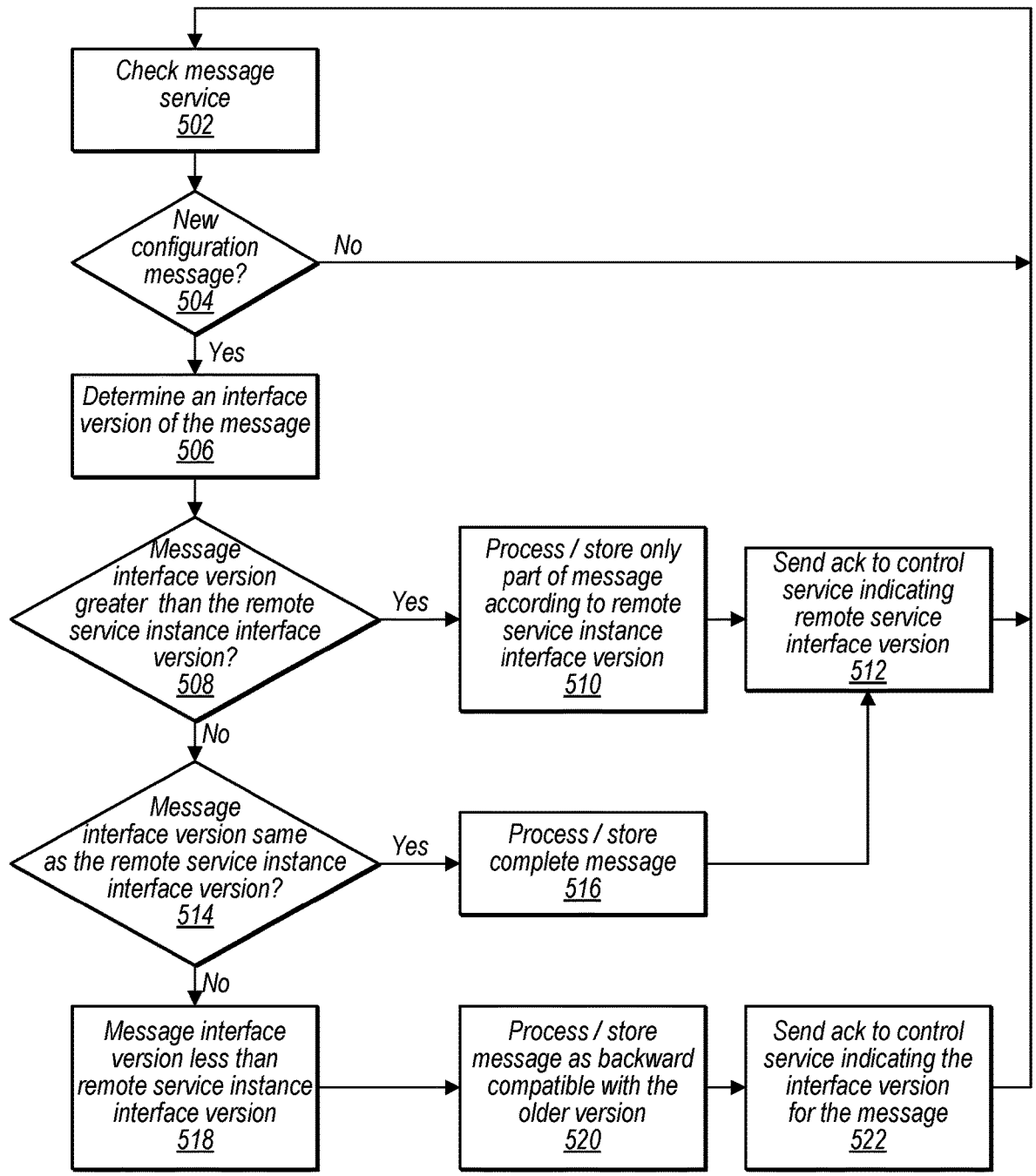
FIG. 5 illustrates a process diagram of metadata synchronization for remote managed systems, according to some embodiments.

In embodiments, the remote instances of the instance groups attempt to process the configuration messages. The processing of the configuration message may complete successful or fail for various reasons, but one example of why a remote instance may fail to completely process the message is that the message may have been generated according to a configuration interface version that is different from the configuration interface version used by the remote instance to process the configuration message (e.g., as illustrated in FIGS. 4 and 5). A benefit of at least some embodiments described herein is that a remote instance practicing the techniques described herein is more likely to be able to process a message generated according to a configuration interface version that is different from the configuration interface version used by the remote instance to process the configuration message. Another benefit of some such embodiments, is the system may, for a failed message, automatically re-send the configuration message until the configuration message is processed successfully. In some embodiments, the configuration interface version used by the remote instance may be updated between the failed message and the successfully processed message, for example, causing the re-sent message to be processed successfully. In some such systems, it may be unnecessary to track or enforce that the data plane be updated prior to performing the corresponding updating on the control plane.

FIG. 1 illustrates that control instances 110A-Z of a control service may operate with different current configuration interface versions. Instance 110A with current configuration interface version 1.2, instance 110B with current configuration interface version 1.2, and instance 110Z with current configuration interface version 1.1. It is contemplated that some systems may operate with all of the control instances 110A-Z generating configuration messages in accordance with a same current configuration interface version (e.g., all control instances using version 1.2).

In some systems (e.g., not limited to just large-scale systems, but also systems that must maintain resources in accordance with high-performance service-level-agreements (SLAs) and other systems) it may prove a challenge to update remote instances (or even control instances) such that all of the instances are using the same version of an interface to communication and process messages. In some such systems, it may be desirable for the system to continue to function even while various different control or remote instances operate in accordance with an out-of-date (or at least not the most recent) version of an interface (e.g., such as but not necessarily limited to a configuration interface).

FIG. 1 illustrates that remote instances may process configuration messages in accordance with an interface version and that the interface version may be different for different remote instances. Remote instances 130A, 140T and 150X are illustrated as using interface version 1.2 for processing the configuration messages. Remote instances 130B, 150Y and 150Z are illustrates as using interface version 1.1 to process configuration messages and remote instance 130N is illustrated as using interface version 1.0 to process configuration messages.

FIG. 1 illustrates use of a message service 122 to decouple the interaction between control service 102 and the remote instances 130, 140, 150. It is contemplated that other techniques for decoupling the interaction between the control service 102 and the remote instances 130, 140, 150 may be used without departing from the scope of this disclosure.

FIG. 2 illustrates a process diagram of metadata synchronization for remote managed systems, according to some embodiments. In the illustrated embodiment, the functionality may be performed by a control instance 110 but at least some of the functionality may be performed by other ones of the illustrated components, in some embodiments.

FIG. 2 illustrates a technique, implemented by a control instance in embodiments, of sending a configuration message to a remote instance that may or may not be using the same version of a configuration interface. In combination with the process in FIG. 3, the illustrated technique may provide an automated way to successfully pass configuration messages between components of a system without requiring that the components all operate in accordance with a same version of an interface and without manual intervention for the case where message-passing fails due to the message not being generated in accordance with an interface version that matches the interface version used by the receiving end to process the message.

At block 202, a new configuration event is identified. For example, system code may be updated to use various new metadata in order to support new functionality, or a client may request any of various types of configuration updates to a remote instance to which the client makes data requests. A configuration message is generated for target remote service instances, the message including fields in accordance with a current configuration interface version (block 204). For example, control instance 110A generates a configuration message in accordance with a version 1.2 (a newer version, in embodiments) of the configuration interface. In the illustrated embodiment, the configuration message is generated without regard for the version of the interface at the target remote service instances. Whereas in many systems it is necessary that the source and target entities agree to use a same version of an interface for passing messages (or the message will fail) management of such a system during upgrades and/or configuration changes can be burdensome to manage. For example, an administrator may be charged with reviewing each instance to verify the same version is used or the system may generate trouble tickets for failed messages that an administrator must then troubleshoot and repair manually. For large-scale systems, such a manual technique may actually make upgrades impossible to perform while maintaining performance levels guaranteed by SLAs, for example. In the example, control instance 110A generates the configuration message in accordance with the control instances current version of the configuration interface (ver. 1.2) even though the message (in accordance with ver. 1.2) will be sent to all of the remote instances 130A-N and remote instances 130B and 130N will process the message using the interface version of the remote instance (here, ver. 1.1 for remote instance 130B, and ver. 1.0 for remote instance 130N). Thus, control instance 110A generates the configuration message regardless of the configuration interface version that the remote instance will use to process the message, eliminating need to track, by the control plane, versions of the interface used by remote instances.

At block 206 the configuration message is sent, according to the current interface version, to a message service for the target remote service instances (a control layer client, or other logic on the target remote instances may be configured to check the message service for messages such as, but not necessarily limited to, the configuration message). The configuration message and interface version sent may be recorded for each remote service instance (block 208) to a configuration record data store, for example.

It is contemplated that the functionality of block 208 may implemented otherwise, may be optional or might be unnecessary for some embodiments. For example, some implementations (e.g., when "positive" or "negative" acknowledgements are used) may record the version or the configuration message for the particular remote instance. In another example, (e.g., when the system does not record the message or interface version used) an acknowledgement received back from the particular remote instance may indicate more than just a positive or negative outcome, the acknowledgement may indicate the interface version used for generating the configuration message (e.g., the interface version may be passed in a header of the configuration message), eliminating the need to record the version, in some embodiments.

Figure 3:
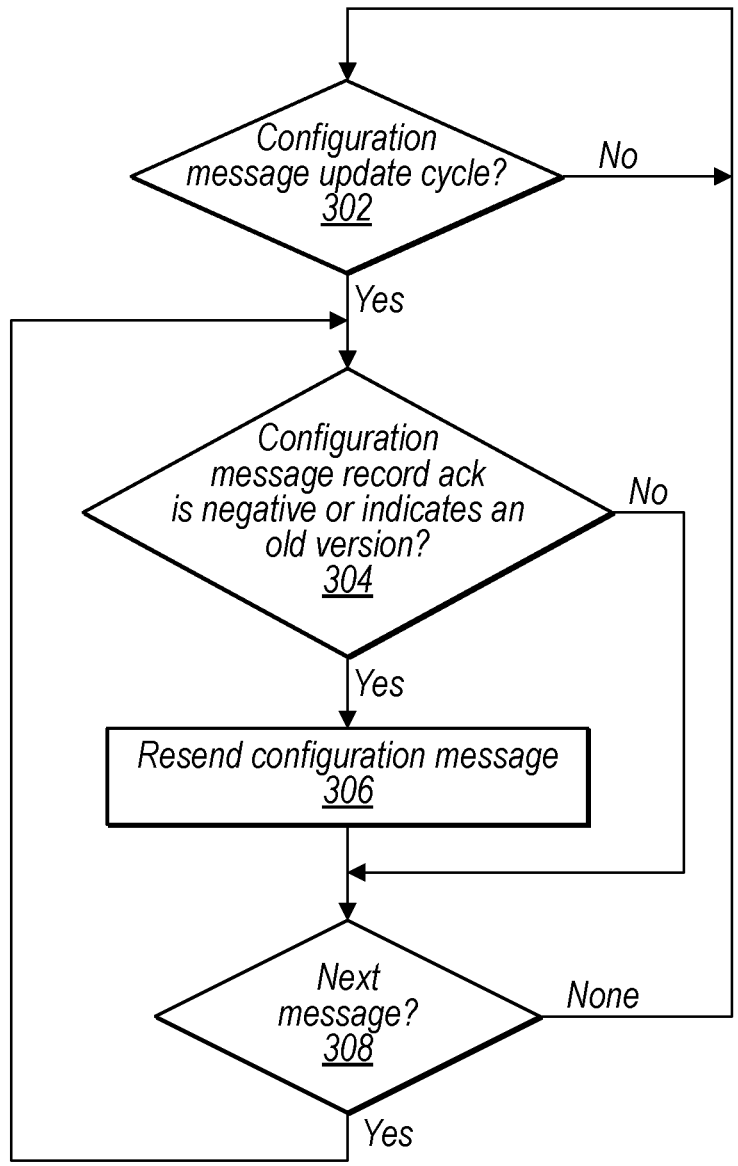
FIG. 3 illustrates a process diagram of a control-side process for metadata synchronization for remote managed systems, according to some embodiments.

A dashed line is illustrated in FIG. 2 between block groups 202-208 and 210-218. In embodiments, the dashed line in FIG. 3 illustrates an indirectness between blocks 202-208 and blocks 210-218. For example, blocks 202-208 may be performed as the illustrated sequence while blocks 210 may performed at some later point in time (such as, but not necessarily limited to after the remote service instance attempts to process the configuration message and sends an acknowledgement message of the configuration message). Additionally, while the functionality illustrated in blocks 202-208 and blocks 210-218 are related, blocks 202-208 generally describe a message for each of the target remote service instances (multiple messages, a plurality of remote service instances) while blocks 210-218 describe processing a single acknowledgement for a single one of the messages. It is contemplated that the process illustrated in blocks 210-218 would be repeated across all of the acknowledgements for the plurality of remote service instances, in some embodiments.

In some embodiments, time may pass (e.g., between block 208 and block 210) as the remote service instances wait for some trigger to obtain the messages from the queue service and/or attempt to recognize the fields of the message or otherwise process the message (e.g., as illustrated in FIGS. 4 and 5, described below) and generate acknowledgements. At block 210, an acknowledgement of the configuration message from a remote service instance (e.g., from one of the target remote service instances that obtained the message from the message service) is received (e.g., by the control service instance 110A). The acknowledgement may indicate a negative result (e.g., the target remote service instance failed to process the message) or positive result (e.g., the target remote service instance completed processing of the message) for the configuration message. For example, the acknowledgement message may include an indication of the version of the interface at the target remote service instance. If the acknowledgement is negative (e.g., an "all_stored" field of the acknowledgement is set to "false" or similar) or indicates that the target remote service instance is using an old version (e.g., an out-of-date version) of the interface (block 212, yes) a record for the configuration message for the remote service instance may be marked to be re-sent (block 216). In some embodiments, the control instance will keep sending the configuration message (e.g., illustrated in FIG. 3, described below) until the remote service instance is upgraded and responds with a positive acknowledgement (e.g., an "all_stored" field of the acknowledgement is set to true, or similar). In embodiments, such a positive acknowledgement tells the control instance that the configuration is complete (e.g., that all metadata in the configuration message is shared) and the control instance can inform the corresponding customer that propagation is done.

If the acknowledgement is not negative (e.g., is instead positive as indicated by an "all-stored" field of the acknowledgement set to "true" or similar) or indicates that the target remote service instance is using a version (e.g., an up-to-date version) of the interface that is at least as recent as the version used to generate the message (block 212, no) a record for the configuration message for the remote service instance may be marked complete (block 216). In some embodiments, the marking of the record to indicate the configuration message is to be re-sent achieves a convergence, bringing the configuration interface version for remote target instances up-to-date with the version used on the control side, for a system that has a control plane and a data plane. In embodiments, an up-to-date version is a same or newer version. In embodiments, an up-to-date version is a same, but not a newer version. In embodiments, an out-of-date version is an older version.

At block 218, further action is performed, if needed. For instance, the control service or instance may generate, for an acknowledgement that is positive or that indicates the configuration interface version used by the remote service instance is at least as recent as the version used for said generation of the configuration message (or is the same version, in some embodiments), a configuration complete message. The control service or control instance may send the configuration complete message, to an administrator account, to a control interface (e.g., block 710) or similar.

In some embodiments, various system (e.g., routing systems or similar) may need to be updated to be aware of the metadata (e.g., to be aware of the storage objects or access points or access privileges indicated by the new metadata in the fields in the configuration message). In various embodiments, the various systems may be notified of the successful completion of the configuration via the configuration complete message.

For some embodiments described herein the above-noted technique can be used to independently upgrade servers that transact in a defined manner (e.g., such as, but not limited to, control plane servers and control clients located on remote data plane servers) while the configuration changes (e.g., metadata sharing, etc.) are in progress. Some embodiments described herein describe a system where data plane instances that use an older version of the configuration interface may be able to still (at least partially) work with a control instance that is sending the latest metadata in accordance with a more recent version of the configuration interface or vice-versa making the technique backwards and upwards compatible, for example.

The above-described FIG. 2 illustrates how configuration messages may be sent between control instances and remote instances in an environment where the control instances and remote instances are not necessarily using the same version of a configuration interface, in embodiments. FIG. 3 illustrates a process diagram of a control-side process for metadata synchronization for remote managed systems, when a record for a configuration message for a remote service is marked to be re-sent, according to some embodiments. The process may be performed by a control instance 110, in various embodiments.

As embodiments described herein illustrate that the remote instances may sometimes fail to fully process the configuration message (e.g., because the remote instance is using an out-of-date version of the configuration interface and cannot recognize one or more fields in the configuration message that is generated according a more current version) FIG. 3 illustrates a configuration message update cycle for identifying messages that need to be re-sent and re-sending those messages. In at least some embodiments, during an intervening period of time between the first message being sent and the re-sending of the message, the target remote instance (or the control instance, in some embodiments) may be updated to use a more recent version of the configuration interface. The configuration message update cycle provides functionality for identifying which messages need to be resent, and sending the message after some period of time has passed to allow for updates of the interface version to be performed at control and/or remote instances across a system with numerous instances, in some embodiments.

At block 302, a determination is made whether to cycle the configuration message update cycle. A cycle may be initiated based on any of various criteria. A few non-limiting examples of criteria include receiving a request via an interface from an administrator to run the cycle, periodic cycling implemented as program instructions, according to a schedule or timer, or based on some performance-based criteria such as some threshold number of error messages indicating a need to resend the messages, initiating a cycle some number of times after a version update has been made in the system, etc. or some combination of some such criteria.

If it is determined to not initiate a cycle, the process waits and return to determine whether to initiate a cycle (block 302, no). Otherwise, for initiation of a cycle (block 302, yes) the control instance begins looking through the records to determine whether any of the configuration message record acknowledgements is negative or indicates an old version (block 304). For example, a record indicating a negative acknowledgement (ACK) indicates that the configuration message associated with the negative ACK was not full processed for the remote instance associated with that record. In another example, a recording indicating an old version of the of the configuration interface indicates that the remote instance was still processing messages using the old version and was unable to fully recognize and process the configuration message.

For the case where the configuration message record acknowledgements is positive or indicates at least the current version (block 304, no) the process may skip to block 308, determining whether there is another message with a record to check. For the case where the configuration message record acknowledgement is negative or indicates an old version (block 304, yes) the control instance may resend the configuration message (block 306) and go on to check the record for the next message (block 308). If there are no more messages (block 308, none), the process may return to block 302. If there are more messages (block 308, yes) the process may return to block 304, but with regard to the next message, and so on.

FIG. 4 illustrates a process diagram of metadata synchronization for remote managed systems, according to some embodiments. The illustrated functionality may be performed by one or more components of an instance of a remote server 130, 140, 150, in embodiments.

At block 402, the remote instance checks the message service 402 (e.g., checks a particular queue of the message service designated for the instance to obtain configuration messages). For no new configuration messages (block 404, no) the system returns to block 402. For the case of a new configuration message the message service (block 404, yes) the remote instance attempts to parse the message (block 404). For the case where the message includes one or more unrecognized fields (406, yes) the remote instance processes the message and/or stores the recognized message fields (block 412) and sends a negative acknowledgement to the control service (block 414). For example, the remote instance may be using an out-of-date version of the configuration interface to recognize the fields of the message (e.g., the message generated using a more current version of the configuration interface at the control instance). Because the out-of-date version of the interface may not specify the same fields as the more current version, the remote instance may be unable to recognize all of the fields (e.g., does not recognize new fields specified by a more recent version). In some embodiments, when the remote instance does not recognize all of the fields of the message, the remote instance may partially-process the message, using the out-of-date version to recognize at least some of the fields of the configuration message. In some embodiments, unrecognized fields may be stored, discarded, ignored or not acted upon and only the recognized fields are processed.

For the case where the message does not include one or more unrecognized fields (e.g., all fields are recognized) (406, no) the remote instance processes the message and/or stores the recognized message fields (block 408) and sends a positive acknowledgement to the control service (block 410). For example, the remote instance may recognize all of the fields in the message because the remote instance is using the same current version as the control instance, or even a more recent version than the version used by the control instance, in some embodiments.

FIG. 5 illustrates a process diagram of metadata synchronization for remote managed systems, according to some embodiments. The illustrated functionality may be performed by one or more components of an instance of a remote server 130, 140, 150, in embodiments.

At block 502, the remote instance checks the message service (e.g., checks a particular queue of the message service designated for the instance to obtain configuration messages). For no new configuration messages (block 504, no) the system returns to block 502. For the case of a new configuration message the message service (block 504, yes) the remote instance determines an interface version of the message (block 506).

In various embodiments described below a remote instance is described as recognizing or being configured for the fields of a message. It is contemplated that for some embodiments, the remote instance may compare a header field in the configuration message that specifies the configuration interface version to the version the remote instance is using to determine whether the remote instance can recognize the fields. Other techniques are contemplated, such as the remote instance attempting to process each of the fields in accordance with the version of the configuration interface at the remote instance (without identifying the version in a header of the message), or similar.

For the case where the remote instance determines that the message interface version (e.g., the version indicated in a header field of the configuration message; also the version in which the message is generated in accordance) is greater than the remote service instance interface version (e.g., the version the remote instance uses to recognize the fields of the message) (block 508, yes) the remote instance may process and/or store only part of the message according to the remote service instance interface version (block 510) and send an acknowledgement to the control service indicating the remote service interface version. In embodiments, sending the indication of the remote service interface version configures the control service to determine whether the remote instance is using an out-of-date version such that the configuration message needs to be re-sent or whether the remote instance is using an up-to-date version such that the configuration message does not need to be re-sent or whether the message interface version is less than the remote service instance interface version such that the message as backward compatible with the older version.

For the case where the remote instance determines that the message interface version (e.g., the version indicated in a header field of the configuration message; also, the version in which the message is generated in accordance) is not greater than the remote service instance interface version (block 508, no) the process goes to block 514, wherein the remote instance determines whether the message interface version is the same as the remote service instance interface version. For the case where the remote instance determines that the message interface version (e.g., the version indicated in a header field of the configuration message; also the version in which the message is generated in accordance) is the same as the remote service instance interface version (block 514, yes) the remote instance may process and/or store the complete message according to the remote service instance interface version (block 516) and send an acknowledgement to the control service indicating the remote service interface version (block 512). In some embodiments, it is contemplated that after processing/storing the complete message (block 516) the system may send an acknowledgement to the control service indicating the interface version for the message (block 522) because the message interface version is the same as the remote service interface version (block 514) for this part of the flow diagram. In the illustrated embodiment there are two distinct paths that lead to sending the same ACK in 512. In embodiments, it is left to logic at the control instance to compare the remote service interface version from the ACK to the version used to generate the message to determine how to handle the ACK correctly.

For the case where the remote instance determines that the message interface version is not the same as the remote service instance interface version (block 514, no) the process goes to block 518, wherein the remote instance determines that the message interface version is the less than the remote service instance interface version. For the case where the remote instance determines that the message interface version is less than the remote service instance interface version (block 518) the remote instance may process and/or store the message as backward compatible with the older version (block 520) and send an acknowledgement to the control service indicating the interface version for the message (block 522). In the illustrated embodiment, the acknowledgement sent in block 522 is different from the acknowledgement sent in block 512 because the message interface version is less (older) than the remote service instance interface version.

Figure 6:
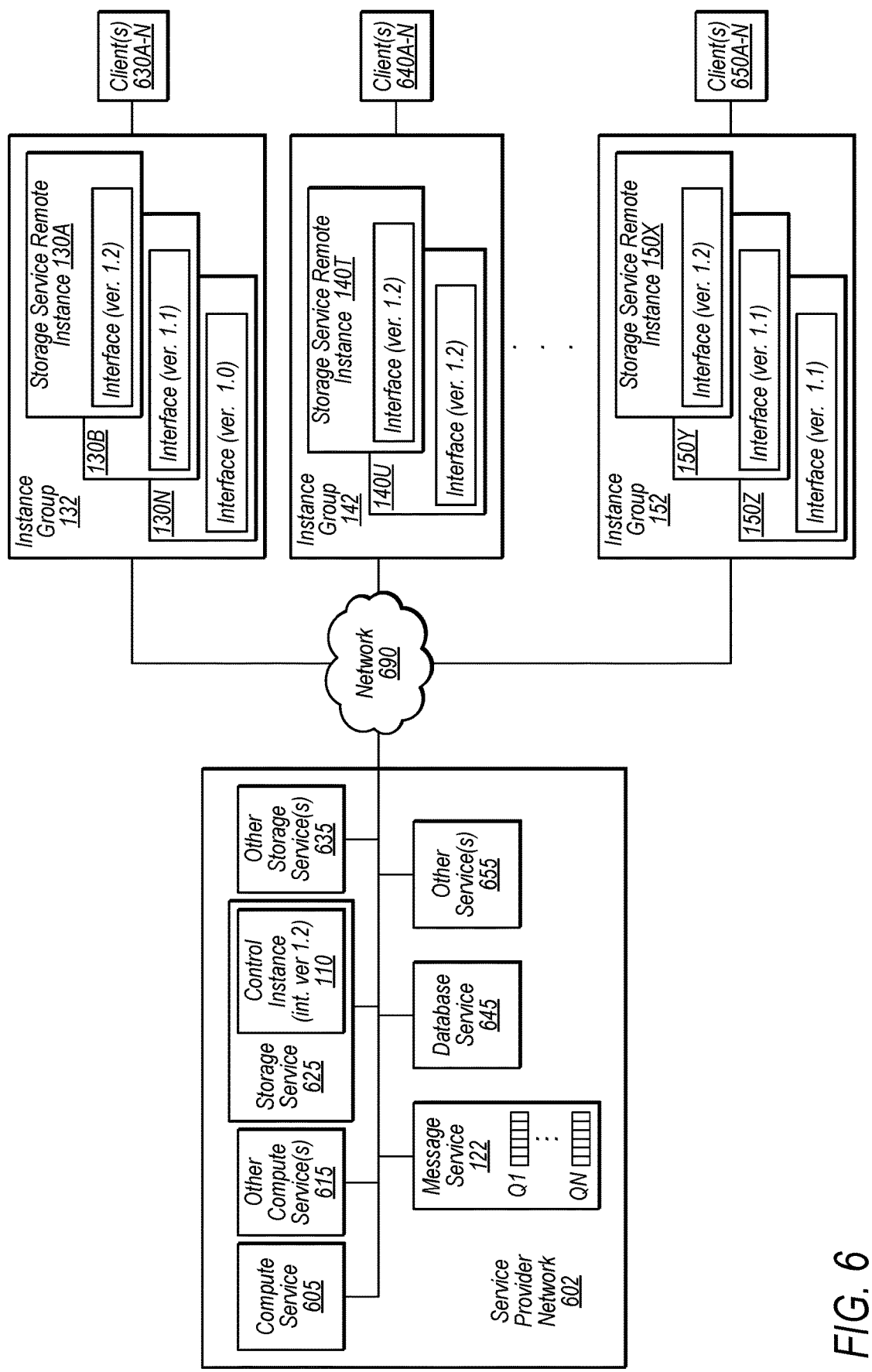
FIG. 6 illustrates a service provider network with various services that implement one or more portions of metadata synchronization with multiple groups of remote server instances, according to some embodiments.

FIG. 6 illustrates a service provider network with various services that implement one or more portions of metadata synchronization for remote managed systems, according to some embodiments. In embodiments, one or more components illustrated in FIG. 6 perform functionality depicted in the process diagrams of FIGS. 2-5.

FIG. 6 illustrates a service provider network 602 with various different service-provider provided storage services (e.g., storage service 625, with control instance 110), message service 122, compute service 605, other compute service 615, other storage service 635, database service 645 and other service(s) 655. In embodiments a service provider storage service (e.g., a managed service) (e.g., block 625) manages storage resources located on both the service provider network 602 as well as on-premise at client networks (e.g., Instance groups 132, 142,. . . , 152 may represent respective client networks with various respective groups of remote instances that store client data locally). For example, the storage service 625 may provide object storage in an on-premises environment to meet local data processing and data residency needs as well as a cloud-based object storage environment (e.g., a "hybrid" storage service). Either or both environments may be accessed by the storage service APIs and features.

Clients (e.g., clients 630 A-N, 640 A-N, 650 A-N) may store data using a common storage interface (e.g., an API to the storage service or similar) to either or to both of the storage resources located at the service provider network 602 and/or at the on-premise storage at the storage service remote instances 130, 140 150 on the client network(s).

In some networks the configuration interface version may be updated to a more recent version. For various reasons (for example, but not necessarily limited to large-scale networks) some but not all of the configuration interface versions may be updated to the more recent version while other version(s) of the interface remain. In some embodiments, an active storage system may operate across numerous instance groups where one or more of the remote instances of the group are actively using a different version of the configuration interface than other instances in the group or than other instances in other groups.

In some embodiments, the control instance(s) (e.g., control instance 110) may all be updated to generate messages for the remote instances using the same, more recent (or "current" with respect to the control plane as a whole, or with respect to the individual control instance, in embodiments) version of the interface while the remote instances may be using various different versions of the interface. In other embodiments, different ones of the control instance(s) (e.g., 110) may use different versions of the interface to generate the messages while the remote instances also use various different versions of the interface to recognize fields in the messages.

In at least the illustrated embodiment, a control plane of the storage service 625 may store configuration information (e.g., metadata or similar for either or both of the on-premises storage environment to meet local data processing and data residency needs and/or for the corresponding cloud-based object storage environment) that can be managed via a control-plane interface (e.g., control interface 710, illustrated in FIG. 7, described below). In embodiments, a control instance 110 of the storage service 625 may send messages (in accordance with a current interface version with respect to the control instance or control plane) to an on-premise remote instance (e.g., 130A, 140T, 150X, etc.) of the storage service via the message service 122 of the service provider (e.g., to update metadata when storage objects are created, to modify access privileges, or similar). The target on-premise remote instance may or may not be able to process the message, or may only be able to process part of the message if the message generated by the control instance 110 was generated in accordance with a version of the interface that is different from a version of the interface being used by the target remote instance. At least some embodiments described herein facilitate processing of messages (configuration messages or otherwise), even when the messages are generated according to an interface version different from an interface version being used by the target instance.

In at least one example, a remote instance operating in accordance with an earlier version of the interface may process a message generated in accordance with a new version of the interface by using the earlier version, a demonstration of backward-compatibility, for some embodiments.

Figure 7:
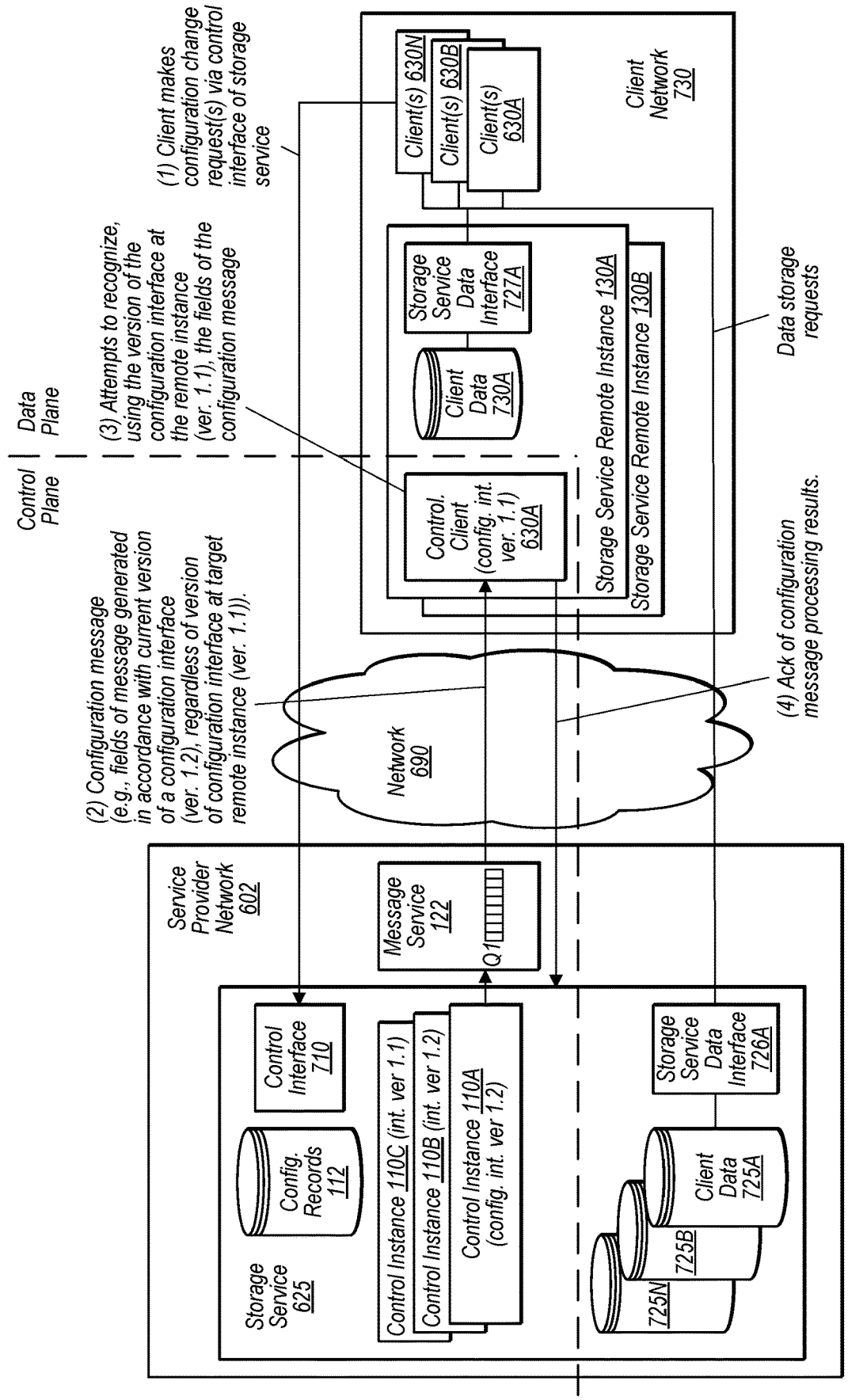
FIG. 7 illustrates a service provider network with various services that implement one or more portions of metadata synchronization with a particular remote server instance located on-premise at a client network, according to some embodiments.

FIG. 7 illustrates a service provider network with various services that implement one or more portions of metadata synchronization for remote managed systems with a particular remote server instance located on-premise at a client network, according to some embodiments. In the illustrated embodiment, portions of a control plane and a data plane of a storage service are illustrated (separate by a dashed line, in the illustrated embodiment) as distributed across a service provider network 602 as well as across a client network 730 (e.g., a client network may include one or more instance groups 132, 142, 152). FIG. 7 illustrates components that perform various processes, similar to those illustrated in FIGS. 2, 3, 4 and 5, for some embodiments.

In the illustrated example, at (1) one of clients 630A-N makes a configuration change request via the control interface 710 of the storage service 625 at the service provider network 602 (e.g., over an intermediate network 690 for example). A control instance 110A associated with the storage service remote instance 130A to which the configuration request(s) pertains learns of the requested configuration change(s) and generates a configuration message (fields of the configuration message generated in accordance with a current version of the configuration interface between the control instance and the remote instance 130A, ver. 1.2 in the example). The control instance 110A sends the message to the message service 122 from which the control client 630A of the remote instance 130A retrieves, at (2) the configuration message.

The control client 630A, at (3) attempts to recognize, using the version of the configuration interface at the remote instance (ver. 1.1 in the example), the fields of the configuration message. The control client 630A responds with an acknowledgement of the configuration message, the acknowledgement indicating success, partial success (in the case of the illustrated embodiment), or failure of the configuration change. FIGS. 4 and 5, described above, provides examples of how the recognition process may be performed and the various acknowledgement types.

FIG. 7 illustrates that the configuration interface is separate from a storage service data interface (726A, 727A). For example, while the configuration interface may generally be for use between the control instances 110 and the control client 630, a storage data interface 726a, 727A may be for use by client(s) 630A-N in making data storage requests to either the local client data stored in client data store 730A on the client network 730 or the client data store(s) 725A, 725B, 725N physically located as part of the service provider network 602, remote from the client network 730. It is contemplated that client data store(s) 725A, 725B, 725N may all be allocated to a single client network, or may each be allocated to store data for respective clients, or that client data for multiple clients may be stored across multiple ones of, or across all of, the client data store(s) 725A, 725B, 725N, in various embodiments. In some embodiments where client data for multiple clients is stored across a number of the client data store(s) 725A, 725B, 725N, the storage service remote instance 130 may be used to locally-isolate some types of the client data from data for other clients.

In embodiments, storage service data interfaces 727A and 726A illustrate distinct pieces of program instructions executing at different locations, but represent a same definition for the API for storage requests make to the storage service such that the types of commands used by the client 630A-N to access local client data 730A are the same types of commands that would be made to access the same data located remotely at client data 725A.

In embodiments, the storage interface of the data plane that a client of a client network would use to make storage requests through to access a local-to-the-client managed instance hosted on the client network could be the same storage interface as is presented by a storage service for cloud-based storage of the storage service that is hosted on the service provider network.

In one example embodiment, a control-plane (e.g., control instance 110) of the storage service is responsible for storage object and access point management (e.g., via REST APIs) and a data-plane is responsible for object management (e.g., via REST APIs). When clients create storage objects/access points the data is stored in a control plane data store and then propagated from the control-plane to the data-plane (e.g., in an eventually-consistent manner). The data-plane needs only a subset of the storage object/access point metadata which is used to service object APIs, in some embodiments.

In some embodiments, a field of the configuration message indicates: an access permission field for accessing the client data store hosted by the managed instance on the client network or indicates information for routing data access requests to a particular data object in the client data store hosted by the managed instance on the client network.

Example Computer System

Figure 8:
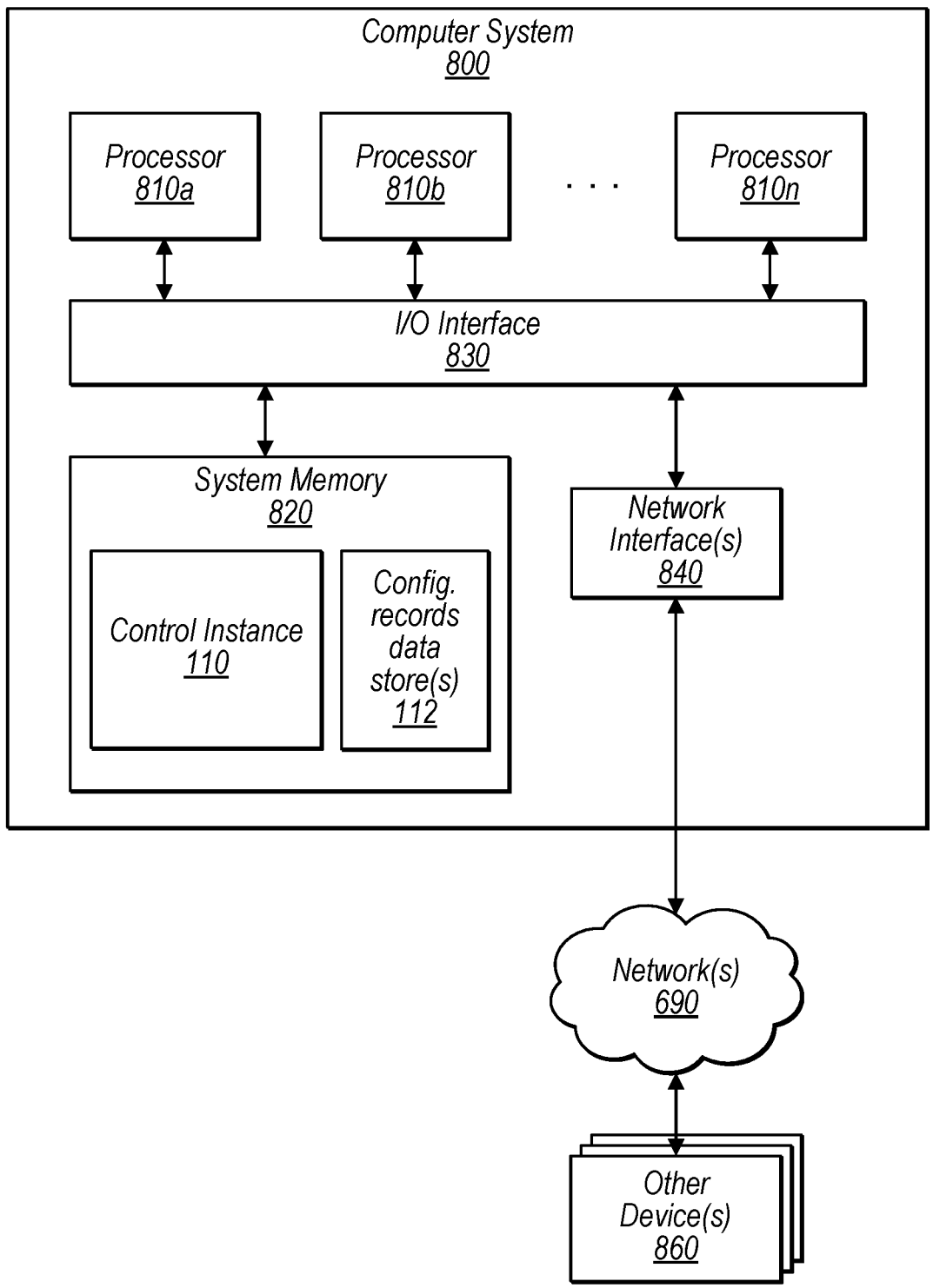
FIG. 8 illustrates an example of a computer system, one or more of which may implement various components that perform functionality described and illustrated throughout the disclosure, according to embodiments.

FIG. 8 illustrates an example of a computer system, one or more of which may implement various components that perform functionality described and illustrated throughout the disclosure, including metadata synchronization for remote managed systems, according to embodiments.

Various portions of systems in FIGS. 1, 6, 7 and 8 and/or methods presented in FIGS. 2-5 described herein, may be executed on one or more computer systems similar to that described herein, which may interact with various other devices of the system.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 860, such as cursor control device, keyboard, audio device, and display(s). In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for metadata synchronization for remote managed systems may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 820 may be configured to store program instructions and/or data accessible by processor 810. In various embodiments, system memory 820 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for metadata synchronization for remote managed systems performed by one or more components of a distributed system, are shown stored within system memory 820 as latency assessor 111 and data stores 404A/406, respectively. In other embodiments, program instructions and/or data may be received, sent, or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840. Program instructions may include instructions for implementing the techniques described with respect to any of the FIGs.

In some embodiments, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. In addition, in some embodiments some or all of the functionality of I/O interface 830, such as an interface to system memory 820, may be incorporated directly into processor 810.

Network interface 840 may be configured to allow data to be exchanged between computer system 800 and other devices attached to a network 690, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 800 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

Memory 820 may include program instructions (e.g., such as control instance code 110 in the illustrated embodiment, but the program instructions could also implement a managed remote instance in some embodiments), configured to implement embodiments of metadata synchronization for remote managed systems functionality performed by one or more components of a distributed system, as described herein, and configuration records data store(s) 112, comprising various data accessible by the program instructions 110. In one embodiment, program instructions 110 may include software elements of a method illustrated in the above figures. Data storage 112 may include data that may be used in embodiments described herein. In other embodiments, other or different software elements and/or data may be included.

Those skilled in the art will appreciate that computer system 800 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., metadata synchronization for remote managed systems) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more processors and memory configured to implement an instance of a configuration controller for managing configuration information for remote instances, the configuration controller instance configured to:
generate, using a current version of a configuration interface at the configuration controller instance a configuration message for one or more target remote service instances of a plurality of remote service instances, the configuration message including fields according to a current configuration interface version;
send the configuration message, according to the current configuration interface version, to a message service for the one or more target remote service instances;
responsive to acknowledgement of the configuration message from one of the target remote service instances:
mark, for an acknowledgement that is positive or indicates that a version of the configuration interface that is up-to-date, with respect to the version used to generate the message, was used by the target remote service instance to process the configuration message, a record for the configuration message as complete for the target remote service instance; and
mark, for an acknowledgement that is negative or indicates use of an out-of-date interface version, with respect to the version used to generate the message, by the target remote service instance, a record for the configuration message to be re-sent for the target remote service instance.

2. The system of claim 1, wherein the configuration controller instance is further configured to:
for respective ones of a plurality of configuration message records to be processed during a configuration message update cycle:
determine, whether the configuration message record is marked to be re-sent; and
responsive to a determination that the configuration message record is marked to be re-sent, resend the configuration message according to the current configuration interface version to the message service for the corresponding remote service instance.

3. The system of claim 1, wherein:
the up-to-date version of the configuration interface is a version that is the same or newer than the version used for said generate the configuration message; and
the out-of-date version of the configuration interface is a version older than the up-to-date version.

4. The system of claim 1, wherein:
the configuration controller instance is implemented as a portion of a control plane of a service provider storage service that manages storage of client data, stored via a data plane, both on-premises at a client network hosting one or more of the target remote service instances and across one or more data storage instances hosted on a service provider network; and
the message service used for sending the configuration message is a queue-based message service hosted on the service provider network.

5. A method, comprising:
performing, by one or more computing devices:
generating, by a control instance and using a current version of a configuration interface at the control instance, a configuration message for one or more target remote service instances of a plurality of remote service instances, the message including fields according to the current configuration interface version;
sending the configuration message, according to the current configuration interface version, to a message service for the one or more target remote service instances;
recording to a data store, the configuration message and configuration interface version sent for the respective ones of the one or more target remote service instances; and
responsive to acknowledgement of the configuration message from one of the target remote service instances:

marking, for an acknowledgement that is positive or indicates that a version of the configuration interface that is up-to-date, with respect to the version used to generate the message, was used by the target remote service instance to process the configuration message, a record for the configuration message as complete for the target remote service instance; or marking, for an acknowledgement that is negative or indicates use of an out-of-date configuration interface version, with respect to the version used to generate the message, by the target remote service instance, a record for the configuration message to be re-sent for the target remote service instance.

6. The method of claim 5, further comprising:
for respective ones of a plurality of configuration message records to be processed during a configuration message update cycle:
   determining, whether the configuration message record is marked to be re-sent; and
   resending, responsive to a determination that the configuration message record is marked to be re-sent, the configuration message according to the current configuration interface version to the message service for the corresponding remote service instance.

7. The method of claim 5, wherein said generating the configuration message including fields according to the current configuration interface version comprises generating the configuration message to include one or more new fields in accordance with the current configuration interface version, wherein the version of the configuration interface prior to the current configuration interface version did not support the one or more new fields.

8. The method of claim 7, wherein the one or more new fields comprise a field associated with data access authorization.

9. The method of claim 7, wherein the one or more new fields comprise a field associated with creation or management of a storage object or access point.

10. The method of claim 5, further comprising:
resending, responsive to a determination that the configuration message record is marked to be re-sent, the configuration message according to the current configuration interface version to the message service for the corresponding remote service instance;
marking, for an acknowledgement that indicates that a version of the configuration interface that is up-to-date, with respect to the version used to generate the message, was used by the target remote service instance to process the configuration message, a record for the configuration message as complete for the target remote service instance;
generating, for the acknowledgement that is positive or that indicates the configuration interface version used by the target remote service instance is at least as recent as the version used for said generation of the configuration message, a configuration complete message; and
sending the configuration complete message.

11. The method of claim 5, further comprising:
receiving, prior to said generating the configuration message and via a control interface of a storage service hosted on a service provider network that comprises said control instance, a configuration request from a client on a client network remote from the storage service;
wherein said generating the configuration message is performed in response to receiving the configuration request from the client on the client network.

12. The method of claim 11, further comprising:
receiving, via a storage service data interface of the storage service from the client on the client network, a storage request directed to client data stored at the storage service on the service provider network;
performing, by the storage service, storage operations indicated in the storage request; and
responding to the client with acknowledgement of completion of the storage request.

13. One or more non-transitory computer-readable media storing program instructions executable on or across one or more processors to implement a managed instance configured to:
obtain a configuration message from a message service, the configuration message for configuring functionality of the managed instance;
determine, according to a version of a configuration interface used by the managed instance to process or store the configuration message:
   whether fields of the configuration message are recognized, or
   whether the version of the configuration interface used by the managed instance is out-of-date relative to an interface version indicated for the message;
where the fields of the configuration message are recognized or the version of the configuration interface is not out-of-date:
   process or store the complete configuration message, and
   send an acknowledgement that is positive or indicates a configuration interface version used by the managed instance that is up-to-date, with respect to the interface version indicated for the configuration message, to a control service; and
where one or more of the fields are unrecognized or the version of the configuration interface is out-of-date:
   process or store the recognized fields, and
   send an acknowledgement that is negative or indicates an out-of-date configuration interface version, with respect to the interface version indicated for the configuration message, to the control service.

14. The one or more non-transitory computer-readable media of claim 13, wherein to determine that the version of the configuration interface is not out-of-date the program instructions cause the managed instance to:
compare the configuration interface version used by the managed instance to a version indicated in a header field of the configuration message; and
determine that the configuration interface version used by the managed instance is the same as a version indicated in a header field of the configuration message.

15. The one or more non-transitory computer-readable media of claim 13, wherein:
to determine the out-of-date configuration interface version, with respect to the interface version indicated for the configuration message, the program instructions cause the managed instance to:
   compare the configuration interface version used by the managed instance the version indicated in a header field of the configuration message;
   determine that the configuration interface version used by the managed instance is a version older than the version indicated in a header field of the configuration message;

to process or store the recognized fields of the configuration message the program instructions cause the managed instance to process or store the configuration message as backward compatible with the older version; and to send an acknowledgement that indicates the configuration interface version used by the managed instance is older than interface version indicated for the configuration message, the program instructions cause the managed instance to send an acknowledgement that indicates the interface version in the header field of the configuration message.

16. The one or more non-transitory computer-readable media of claim 15, wherein:

to process or store the configuration message as backward compatible with the older version the program instructions cause the managed instance to process or store only the fields of the configuration message recognized in accordance with the older version and discard or not act upon remaining fields in the configuration message.

17. The one or more non-transitory computer-readable media of claim 13, wherein to determine the out-of-date configuration interface version, with respect to the interface version indicated for the configuration message, the program instructions cause the managed instance to:

compare the configuration interface version used by the managed instance the version indicated in a header field of the configuration message; and determine that the configuration interface version used by the managed instance is older than a version indicated in a header field of the configuration message.

18. The one or more non-transitory computer-readable media of claim 17, wherein to send the acknowledgement that indicates the out-of-date configuration interface version, with respect to the interface version indicated for the configuration message, to the control service the program instructions cause the managed instance to send the acknowledgement indicating the interface version used by the managed instance.

19. The one or more non-transitory computer-readable media of claim 18, storing program instruction executable on or across the one or more processors to perform:

responsive to receipt, by the managed instance, of a data storage request from a client on a client network, wherein the managed instance is also hosted on the client network:

perform, at a client data store hosted by the managed instance on the client network, one or more storage operations indicated by the data storage request; and return an acknowledgement of performance of the data storage request to the requesting client on the client network.

20. The one or more non-transitory computer-readable media of claim 19, wherein a field of the configuration message indicates:

an access permission field for accessing the client data store hosted by the managed instance on the client network; or information for routing data access requests to a particular data object in the client data store hosted by the managed instance on the client network.

* * * * *